(12) United States Patent
Miller

(10) Patent No.: US 6,882,977 B1
(45) Date of Patent: Apr. 19, 2005

(54) METHOD AND FACILITY FOR DISPLAYING CUSTOMER ACTIVITY AND VALUE

(75) Inventor: David J. Miller, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 258 days.

(21) Appl. No.: 09/629,262

(22) Filed: Jul. 31, 2000

(51) Int. Cl.⁷ .............................................. G06F 17/60
(52) U.S. Cl. ............................ 705/10; 705/14; 705/27; 345/440; 345/133
(58) Field of Search .............................. 705/10, 14, 27, 705/26; 345/440, 133, 433; 706/12; 707/1, 526

(56) References Cited

U.S. PATENT DOCUMENTS

| | | | |
|---|---|---|---|
| 5,041,972 A | * | 8/1991 | Frost ............................. 705/10 |
| 5,894,310 A | * | 4/1999 | Arsenault et al. ........... 345/419 |
| 6,029,141 A | * | 2/2000 | Bezos et al. .................... 705/10 |
| 6,100,901 A | * | 8/2000 | Mohda et al. ................ 345/440 |
| 6,169,534 B1 | * | 1/2001 | Raffel et al. ................. 345/581 |
| 6,182,097 B1 | * | 1/2001 | Hansen et al. .................. 707/3 |
| 6,237,006 B1 | * | 5/2001 | Weinberg et al. ........ 707/103 R |
| 6,369,819 B1 | * | 4/2002 | Pitkow et al. ............... 345/440 |
| 6,430,539 B1 | * | 8/2002 | Lazarus et al. ................ 705/10 |
| 6,526,389 B1 | * | 2/2003 | Murad et al. .................. 705/10 |
| 2001/0014868 A1 | * | 8/2001 | Herz et al. ..................... 705/14 |

FOREIGN PATENT DOCUMENTS

GB    1035485 A2  *  9/2000    ........... G06F/17/60

OTHER PUBLICATIONS

Meyer Joachim, Information structure and the relative efficafy of tables and graphs. Human Factors Dec. 1999.*
Kok, YH, Using cluster analysis to determine the media agenda, Aslib Proceedings, Nov. 1999.*
Grushkin Barry, Predicting movement, Intelligent Enterprise, Aug. 3, 1999.*

* cited by examiner

*Primary Examiner*—Mark Fadok

(57) ABSTRACT

A method and facility for displaying information about a multitude of different customers. The method includes, for each customer, receiving a set of numeric values, each associated with one of a plurality of different parameters. A symbol is generated for each customer, and the symbols are spatially arranged, based on the numeric values. The method may include collecting customer interactions during web browsing, and converting interaction data to a limited data set of the values for display and storage. The values may be displayed in three dimensional format for viewing, and may be revised over time and as additional customer interactions occur.

16 Claims, 2 Drawing Sheets

METHOD AND FACILITY FOR DISPLAYING CUSTOMER ACTIVITY AND VALUE

FIELD OF THE INVENTION

This invention relates to the visual display of quantitative information, and more particularly to the display of electronically stored customer transaction and value information.

BACKGROUND AND SUMMARY OF THE INVENTION

Internet retail commerce enables retailers operating web sites to collect extensive data about customers' web browsing and shopping activities. This data may be associated with a particular customer who has opted to identify him or herself to the retailer by registering, or may be associated with a unique device identifier such as a "cookie" assigned by the retailer to the particular user's computer or other communication device. In such cases, a pattern of activity may be associated with the cookie, although the identity of the customer is not known. Other commerce and communications activities may generate extensive data that may be stored for analysis.

Data collected by these means is analyzed predict the future commercial activities of the customers. Customers may be evaluated, and assigned a "lifetime value" based on the data. Customers with higher value may be selected to receive certain promotions and discounts, and may be studied to determine whether they have common characteristics. Other potential customers with such characteristics might also be targeted with promotions, with the intent that they would be more likely than most to become a high value customer.

Marketing analysts generally evaluate customers in three primary characteristics: recency, monetary, and advocacy. High value customers are those who have a high score in each of these areas, having visited or made purchases recently, having made relatively high cost or high profit purchases, and having a pattern of recommending the retailer to other potential customers.

Existing marketing analysts use the extensive and detailed data collected during web browsing and electronic transactions to generate estimates of customer values. This requires the collection and extended storage of immense amounts of data, and significant resources to analyze the data. Typically, custom-created software applications are required for each retailer, which consumes significant time and resources. Moreover, even well-crafted analyses of extensive data have significant limitations.

Existing techniques require that the analyst develop a hypothesis about the characteristics of customers before conducting an "experiment" in the form of data analysis. Such an experiment may compare various groups with different demographic, or other commercial activity characteristics, in order to determine which is more likely to be a highly valued customer in the future. However, there may be important patterns in the data that the experimenter never discovers, due to testing the wrong hypotheses.

Another disadvantage of conventional customer data analysis techniques is that they do not account for the changing data, and often view only a snapshot at a particular time, or compare multiple snapshots at limited time intervals. This has limited effect to determine changing qualities of different customers, such as those who have increasing or decreasing value.

The present invention overcomes the limitations of the prior art by providing a method and facility for displaying information about a multitude of different customers. The method includes, for each customer, receiving a set of numeric values, each associated with one of a plurality of different parameters. A symbol is generated for each customer, and the symbols are spatially arranged, based on the numeric values. The method may include collecting customer interactions during web browsing, and converting interaction data to a limited data set of the values for display and storage. The values may be displayed in three dimensional format for viewing, and may be revised over time and as additional customer interactions occur.

DETAILED DESCRIPTION OF A PREFERRED EMBODIMENT

Figure 1:
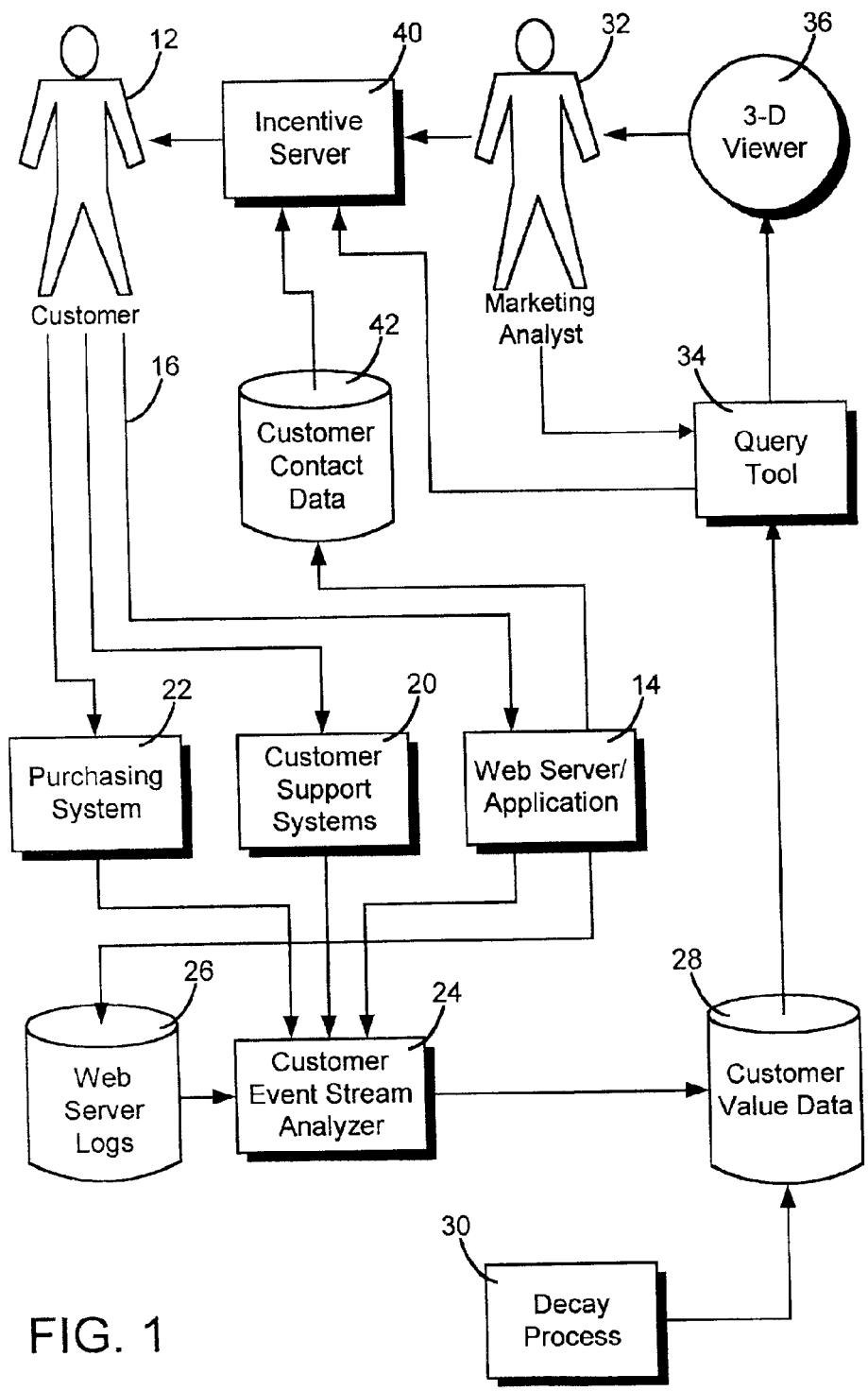
FIG. 1 shows a block diagram of a facility and method according to the preferred embodiment of the invention.

FIG. 1 shows an Internet retailing and market analysis system 10 in which a customer 12 interacts with an on-line retailer via a web browser application 14, by transmitting interaction information 16 over any of the variety of communication links. The customer may further interact with an automated or staffed customer support system 20 (such as with questions or problems to be resolved), and/or with a purchasing system 22 of the retailer, such as a telephone ordering service, or a point of purchase system for in-person credit card purchases.

The customer interactions may include purchase transactions, web browsing (e.g. pages visited, items put in shopping carts,) entry of customer identification information such as taken during a registration process, and/or referrals of other potential customers, such as by clicking an offer to send a promotional discount to a friend.

Each of the systems with which the customer interacts is connected to a customer event stream analyzer 24, which is a computer operated by the retailer. The analyzer acts as an event stream parser that receives this detailed raw information about each customer interaction with any of the above devices, and stores the information in the database of a storage device 26 connected to the analyzer. The logs are arranged in records, with a record for each customer (identified by customer-provided information, or simply associated with a cookie). Each record includes raw data having an entry for each page visit, each purchase, and all other interactions recorded. The web server logs are generated by the web server software (e.g. IIS, Netscape, Apache, etc.). These are standard files that every web server generates, and can be parsed/mined for information using tools like WebTrends. The Customer Event Stream Analyzer (24) would only read these server logs, to pick out pertinent customer events (e.g. visits, referrals, purchases). In a simple application, the web server log may be the only source of customer interaction data.

The analyzer 24 processes the raw data for each customer, and analyzes it to generate a limited data set that indicates a useful estimate of the "Value" of the customer's actions. This analysis uses known heuristics and may be a relatively simple function based on the raw data, or a more complex expert system using the data. In the preferred embodiment, the value data set for each customer is limited to only a few values, each for a selected parameter indicating a factor of customer value.

A "recency" factor indicates how recently the customer made some form of transaction. In a simple embodiment, this may record the time since the last site visit. In other embodiments, it may be a function of several of the most recent visits, weighted based on the significance of each visit, such as whether a purchase was made, and whether the purchase was large or small.

A "monetary" factor indicates whether a purchase has been made by the customer, and if so, of what size. In more complex systems, the monetary function may look at all or some of past purchases, with weight given to larger numbers of transactions, to more recent transactions, and/or to more profitable transactions.

The analyzer transmits the value data to a storage device 26 containing a database record for each customer. The raw data used to generate the value data is then discarded, or may optionally be archived if storage space is not a concern. Each new customer's interaction data is processed this way to generate a relatively small record that indicates the current (?) value of the customer without redundant or extraneous data that would require extra storage space, slow processing, and which may obscure or distract from observation of key data.

For returning customers for whom a customer value database record has already been generated and stored, the analyzer 24 collects and stores the raw interaction data, then processes it and modifies the customer value data accordingly. The processing may also occur in real time as raw data is received.

The customer value data is modified based on each new raw data element or set of elements, as a function of the raw data and the preexisting parameter values. The data format for a three-parameter record (such as recency "r", monetary "m", and advocacy "a") for a given customer "C", may be in the form C(r,m,a). The record identifies the customer with a unique identifier, and has a value for each of the parameters. As customer activity occurs over time, these values may rise and fall, each within a range from minimum to maximum.

The values are also changed over time even in the absence of additional customer activity by a decay processor 30. One or more of the parameters are diminished toward a low value direction at regular time intervals. The recency parameter is best suited to this diminishment. This function avoids the need to store the dates and times of past interactions, and then later apply a function to generate a recency score. The diminishment may be offset by the increase of the recency score by occasional visits. The decay function may also be proportional to the current value for the parameter, so that a high value is decremented more in an inactive period than is a low value. This yields different scores for visitors with steady-state patterns at different revisitation rates. A function that simply subtracted a fixed amount in each interval would eventually yield a maximum score for all customers visiting more frequently than a given threshold, and a minimum score for those below the threshold.

The customer value data in device 26 is usefully accessed by a marketing analyst 32. In the preferred embodiment, the analyst is symbolically represented by a person, although the analyst may be replaced by a computer expert system in certain other embodiments. The analyst accesses the customer value data by employing a query tool 34 in the form of software operating in a computer processor connected to the data storage device 26. The query tool permits the analyst to select a set of some or all of the customer records, with limitations if desired to selected dates or other parameters. The analyst also selects a format in which the data is to be displayed on a display screen 36.

By viewing the data in display formats to be discussed below, the analyst may discern patterns from the multitude of points, each visually represented by a symbol having a position, qualities, and/or characteristics representing the quantitative values of each parameter, or of those particular parameters selected for display by the analyst. The query tool permits the analyst to select groups of symbols for further analysis, or for receipt of promotional incentives and the like.

To send promotional incentives, the query tool polls the customer value database 26 for the customer IDs associated with the selected customers, and transmits them to an incentive server 40 connected to the Internet. The incentive server retrieves the customer email address or other contact address information from a customer database 42 that has received the data from the web application 14 visited by the customer earlier. The promotional incentive, created by the analyst to be well suited for the selected segment of customers, is transmitted to each customer address. In the case where the customer identifier is only a "cookie" on their computer (i.e. there is no way to contact the customer because they have not given us contact information such as an email address), the incentive is displayed on the customer's screen the next time that customer visits the web site.

Figure 2:
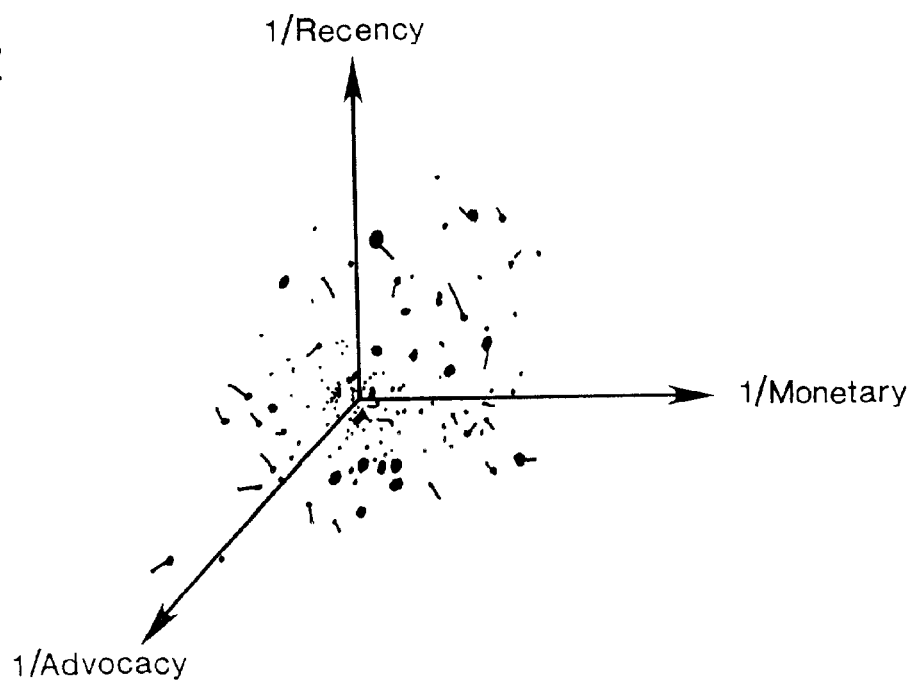
FIG. 2 shows a display output according to the embodiment of FIG. 1.

FIG. 2 illustrates an exemplary display screen of customer value data. It is a two-dimensional representation of a three-dimensional scatter plot, viewed in perspective from a direction selected by the analyst. The orthogonal axes are labeled with the three value parameters, with each point's location based on its value for each parameter. In the illustrated embodiment, the axes are labeled with the reciprocal of each parameter, so that as the value for that parameter increases, the displayed point or symbol is positioned closer to the origin of the axes. In a simple case, the analyst may select those customers within certain radius of the origin, with the radius based on intuitive visualization intended to capture the dense core, but not to include those where the density becomes sparser.

The analyst may use the query tool to effectively change the viewpoint. This permits one parameter to be controlled by viewing along its axis for a plot of two parameters. More helpfully, viewing while slowly rotating the array of points communicates three dimensional information to help the analyst identify patterns or clusters that might otherwise be lost against background or foreground points. Three dimensional viewing may also be provided with a true binocular "virtual reality" display giving each eye of the analyst a different view to provide realization of depth perception. Depth may also be provided by differences in brightness, size or other techniques.

The symbols used for each customer need not be uniform. Other information about each customer may be conveyed by the visual characteristics of each symbol. In addition to the two and preferably three dimensions corresponding to the three primary parameters, other parameters my be illustrated, as may aspects of the primary parameters. The symbols may have different sizes, brightness, color and shape. Symbols may have a directional orvector indicator, which may have a magnitude such as length or width. Thus, a symbol's current direction and velocity of "motion"

through space, which indicates the customer's changing value, may be displayed. Customers in the same position may be moving toward or away from the direction of highest value, and this may lead the analyst to consider such customers differently.

Figure 3:
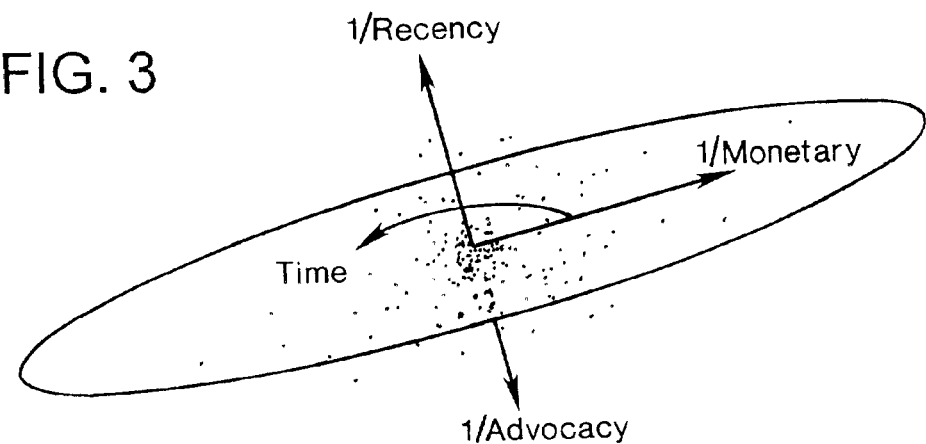
FIG. 3 shows a display output according to an alternative embodiment of the invention.

In contrast to the Cartesian coordinate graph of FIG. 2, FIG. 3 shows a comparable display in polar coordinates, which may be useful for visualizing certain data patterns, and which is discussed in greater detail in the example below.

EXAMPLE

For displaying data, an interactive 3-D viewer such as X3D (http://hpux.csc.liv.ac.uk/hppd/hpux/X11/Viewers/x3d-2.2/) for X-Windows or the Cosmo Player (http://www.cosmosoftware.com) for the web may be used to view and interact with the customer space. Other versions may use the Extensible-3D standard (also abbreviated "X3D"-http://www.web3d.org/x3d.html).

Using a 3-D viewer, marketing analysts can graphically define regions of the virtual space for customers in that space to receive certain incentives. If customer position history is stored, each customer's path through the virtual space may be traced to see movement trends.

For each customer, only their current position in the virtual space is stored, plus a "force vector," which is a factor of the customer's recent event history and the opposing decay force—essentially, the customer's current trajectory in the space. If it is desired to view movement through the space over time, a history of the customer's positions is also kept. There is no requirement for huge databases of customer events, nor extensive data mining—just a value for each axis, a force vector for each axis, and if desired a history of the values for each axis. The data collection software requires only minimal development for each application, and the 3-D viewers are readily available. However, it would be preferable to fine-tune the viewer to aid the marketing analyst, e.g. be able to show only certain customers, or certain regions of the space, turn tracing on & off, and other interactive display features.

In some instances, it is disadvantageous to use the Cartesian coordinate system of FIG. 2 with a 3-D viewer, such as when it is difficult to view thousands of points against a background of thousands of points. In these instances, it may be easier to view the points and traces in the polar coordinate system of FIG. 3, as if the customers are moving like stars in a galaxy. Theta is used to plot time, and "r" to plot the inverse value, as in the Cartesian coordinate system. The advantage of a "galaxy" layout is one can view it from the top like a disk, and more readily see points without many other points in the background. For tracking customers on a web site, each point on the perimeter of the disk may be assigned to an individual referrer website, so that it can be seen visually how much traffic is coming from each referrer. The decay or inverse gravity force causes inactive customers to drift away from the center of the galaxy as they rotate around it, eventually dropping off the event horizon when all their values reach zero. In this "galaxy" layout, the most highly valued customers are seen as quickly spiraling in toward the center of the galaxy.

It is believed that using the method and facility of the preferred embodiment, 1 mullion customers may be tracked in a 300MB database (excluding customer contact information), and be visually seen all at once, if desired.

This method takes advantage of the human visual system's ability to see clustering, patterns, and movement of thousands of data points at once. Thus, customer incentive decisions can be made visually, not by complex data mining algorithms processing huge volumes of customer event history in a database.

Displaying customer "value" in 3-D space also enables an analyst to learn about the data in manners not adaptable to observation of raw data or statistical breakdowns of raw data. Unexpected patterns may lead to useful new hypotheses.

The data collection software looks at a stream of customer events (visits, purchases, referrals, etc.) and uses those to update that customer's Recency, Advocacy, and Monetary values, as well as their trajectory vector. Also, on a regular basis the "decay" is applied to every customer. The database to store customer data consists of (at least) the following tables:

| Customer Value Table |
| --- |
| Customer ID - From registration, cookie, email address, etc. |
| Acquisition date/time - Date/time of first interaction with this customer |
| Acquisition source - Referring URL or other source |
| Recency value |
| Monetary value |
| Advocacy value |
| Recency velocity - velocity along Recency axis |
| Monetary velocity - velocity along Monetary axis |
| Advocacy velocity - velocity along Advocacy axis |
| Last event date/time - date/time of last customer interaction or application of "decay" |

| Customer Contact Table |
| --- |
| Customer ID |
| Name |
| Email address |
| Street address |
| Etc. |

The preferred embodiment may be illustrated with an example. Jane Doe hears about oursite123.com from a friend. She visits the site, and decides to voluntarily register herself using her email address and a password in return for some incentive. This creates a record in the customer contact table (via the web application), and also initial values for Recency, Advocacy, and Monetary values (X,Y,Z position) in the customer value table (via the Customer Event Stream Analyzer).

A week later, Jane visits again, and clicks on the "Tell a Friend" button, to tell someone else about the site. This causes a big jump in her Advocacy value, and a jump in her Recency value. On the 15th of the month, the "decay" process awakens, and decrements each customer's values by some constant amount (unless the value is already zero). It will do this again on the 1st.

A few days later Jane returns, and this time makes a purchase. This causes her Recency and Monetary values to be increased.

Two months later, a marketing analyst uses the Query Tool to look at some set of customer data in the 3-D viewer, and decides to send a "$10 off" incentive to all the people in a certain region of the virtual space, including Jane. The analyst marks the region of space, and the query tool sends the list of customers in that space to the Incentive Server, which looks up the contact information and initiates the distribution of the $10 off incentive to those customers.

While the above is discussed in terms of preferred and alternative embodiments, the invention is not intended to be so limited.

What is claimed is:

1. A method creating a computer graphic display useful for displaying information about a multitude of different customers comprising the process steps of:

downloading for each customer from a web server a set of numeric values, each associated with parameters including a recency indicator, and an advocacy indicator, decaying the numeric value associated with the recency indicator over time according to an absence of activity by each customer;

increasing the numeric value associated with the recency indicator over time according to recent activity by each customer generating for each customer a symbol;

wherein the symbol's movement dynamically changes, arranging a plurality of symbols spatially to create at least one cluster in a galaxy layout according to a polar coordinate system based on the numeric values;

displaying the galaxy layout on a display device to distinguish trends and patterns in customer behavior, wherein said galaxy layout contains visual representations of patterns and movement corresponding to trends in customer behavior, manipulating said computer graphic display by a user to identify one or more customer groups to be part of a marketing campaign, based upon identification of said cluster within a region of space in the galaxy layout, said customer groups being further identified by customers within a user defined radius of the origin of said cluster.

2. The method of claim 1 including generating the numeric values based on an Internet communication activity of the customer.

3. The method of claim 2 including converting initial data based on the communication activity to a limited data set of the numeric values.

4. The method of claim 3 including receiving additional data based on further communication activity, and modifying the numeric values based on the additional data.

5. The method of claim 1 wherein each symbol includes a characteristic indicating a numeric value of a selected parameter.

6. The method of claim 5 wherein the characteristic is selected from a group comprising motion, color, size, shape, length, direction, intensity.

7. The method of claim 1 wherein arranging the symbols includes generating a representation of a three-dimensional array.

8. The method of claim 1 including the step of selecting a subgroup of customers based on a spatial region in which their corresponding symbols reside.

9. A computer readable memory operable to facilitate displaying information about a multitude of different customers comprising:

a first set of instructions providing for downloading from a web server, for each customer, a set of numeric values, each associated with parameters including a recency indicator, and an advocacy indicator;

a second set of instructions generating for each customer, a symbol wherein the symbol's movement changes dynamically;

a third set of instructions operable to decay the numeric value associated with the recency indicator over time according to an absence of activity by each customer;

a fourth set of instruction operable to increase the numeric value associated with the recency indicator over time according to recent activity by each customer, a fifth set of instructions operable to arrange a plurality of the symbols spatially to create at least one cluster in a galaxy layout according to a polar coordinate system based on the numeric values;

a sixth set of instruction operable to create a graphical display of the galaxy layout on a display device to distinguish trends and patterns in customer behavior, said galaxy layout containing visual representations of patterns and movement corresponding to trends in customer behavior, a seventh set of instructions invoked by a user to manipulate said graphical display of information to identify one or more customer groups to be part of a marketing campaign, based upon identification of said cluster within a region of space in the galaxy layout, said customer group being further identified by customers within a user defined radius of the origin of said cluster.

10. The computer readable memory of claim 9 including an eighth set of instructions to generate the numeric values based on an internet communication activity of the customer.

11. The computer readable memory of claimed 10 including a ninth set of instructions to convert initial data based on the communication activity to a limited data set of the numeric values.

12. The computer readable memory of claim 11 including a tenth set of instructions to receive additional data based on further communication activity, and to modify the numeric values based on the additional data.

13. The computer readable memory of claim 9 wherein each symbol includes a characteristic indicating a numeric value of a selected parameter.

14. The computer readable memory of claim 13 wherein the characteristic is selected from a group comprising motion, color, size, shape, length, direction, intensity.

15. The computer readable memory of claim 9 wherein the fifth set of instructions further serves to generate a representation of a three-dimensional array.

16. The computer readable memory of claim 9 including a eleventh set of instructions to select a subgroup of customers based on a spatial region in which their corresponding symbols reside.

* * * * *